April 6, 1926.
S. BORGNIS
TEA AND COFFEE HOLDER FOR POTS
Filed Oct. 10, 1925
1,579,636.
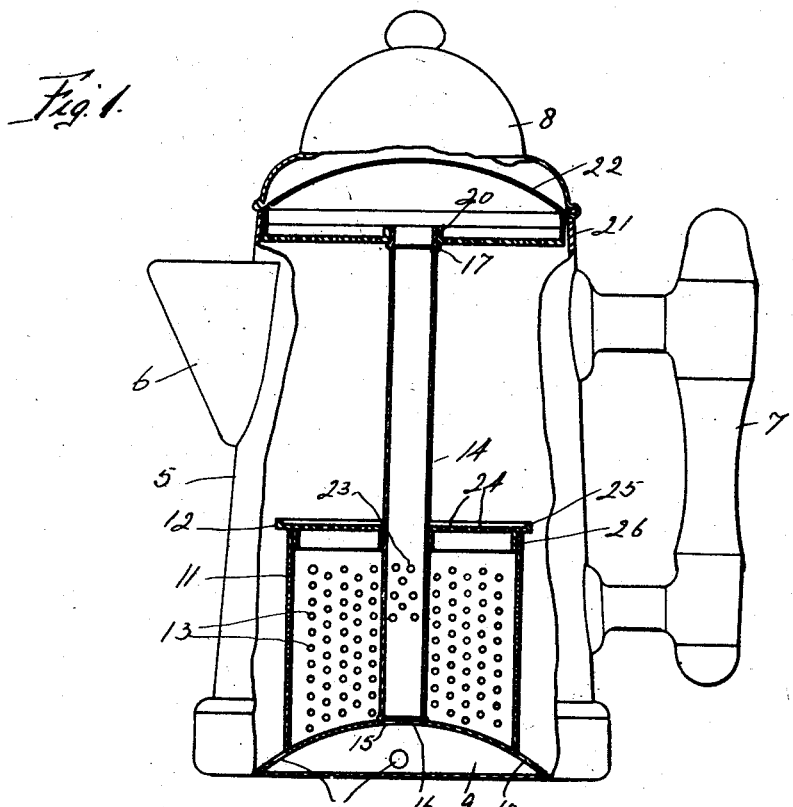
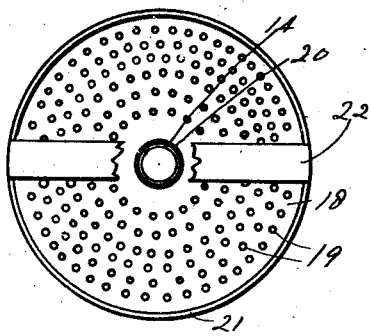
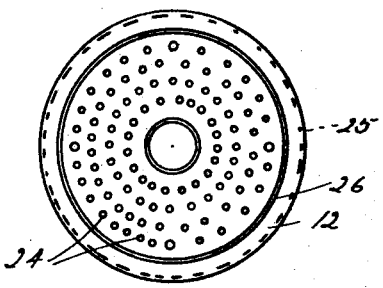
INVENTOR
Samson Borgnis Patented Apr. 6, 1926.

1,579,636

UNITED STATES PATENT OFFICE.

SAMSON BORGNIS, OF PHILADELPHIA, PENNSYLVANIA.

TEA AND COFFEE HOLDER FOR POTS.

Application filed October 10, 1925. Serial No. 61,699.

*To all whom it may concern:*

Be it known that I, SAMSON BORGNIS, a citizen of the United States, residing at 217 North Ashdale Street, Olney, Philadelphia, in the county of Philadelphia and State of Pennsylvania, have invented new and useful Improvements in Tea and Coffee Holders for Pots, of which the following is a specification.

My invention relates to new and useful improvements in a tea and coffee holder for pots, and has for its primary object to provide an exceedingly simple and effective device of this character whereby tea, coffee and the like may be confined while the water in the pot is allowed to percolate therethru in order to extract the flavor from the contents of the holder.

Another object of the invention is to provide for the construction of devices of this character whereby a holder may be placed in any ordinary coffee or tea pot.

A further object of my invention is to provide a tea and coffee holder embodying few parts so arranged that they are always held together, thereby preventing loss or accidental displacement of said parts.

A still further object of the invention is to provide a holder for tea, coffee and the like which comprises a base, a perforated receptacle on said base but not in communication therewith, a tube running from the base and thru the receptacle to a point in proximity to the top of the pot, a perforated disc fixed to the top of the tube and provided with a handle whereby the device may be readily removed from or replaced in the pot, and a perforated cover for the receptacle slidably mounted upon the tube.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:—

Fig. 1, is a side elevation of a tea or coffee pot with a portion broken away and shown in section to illustrate the use of the holder which is shown in section.

Fig. 2, is a plan view of the holder with a portion of the handle broken away.

Fig. 3, is a bottom or inner plan view of the receptacle cover.

In carrying out my invention as herein embodied, 5 represents a tea or coffee pot of any preferred, well known or usual construction provided with a spout 6, a handle 7 and a cover 8, the latter preferably being hinged to the pot.

The holder for the tea, coffee or the like includes a dome shaped, substantially hemispherical or concavo convex base 9, having any desirable number of perforations 10 adjacent its lower edge. On this base above the perforations is fixed a receptacle 11, preferably of cylindrical shape with the base 9, acting as its bottom, while the upper edge is open except when closed by the cover 12. The receptacle has perforations 13 formed in its side walls.

A tube 14 has its lower end set in the hole 15 in the base 9, to which said tube is fixed in any suitable manner as by swedging, soldering or sweating, and in order to provide a shoulder against which the base will abut when the parts are being assembled, said tube has a rib 16 formed thereabout adjacent its lower end. This tube projects thru the receptacle and extends beyond the same a sufficient distance to bring its upper end in proximity to the top of the pot with which the device is to be used, and adjacent its upper end is formed another rib 17 to provide a shoulder against which will abut the disc 18 when placed on the upper end of said tube where it is fixed in any suitable manner. This disc is of sufficient size to approximately fit the upper end of the pot with which it is used, and said disc is provided with perforations 19. Said disc 18 may be made of relatively thin material and so fashioned as to provide a hub 20 where it fits about the tube 14 and a flange 21 about its perimeter thereby providing a saucerlike receptacle for the purposes presently described. The device is also provided with a handle 22 whereby the device may be readily carried from place to place, removed from or replaced in the pot.

The tube 14 has perforations 23 formed therein only within that portion lying inside of the receptacle, and preferably only adjoining the upper portion of said receptacle so that some of the water or brew passing thru the tube may flow out thru these perforations into the ingredients held within the receptacle.

The cover 12 beforementioned is slidably mounted upon the tube 14 between the receptacle 11 and disc 18 so that when said receptacle is to be filled with tea, coffee or the like said cover may be moved upward along the tube so as to uncover the upper open end of said receptacle, and after the latter has been supplied with the necessary amount of ingredients, the cover may be slid down the tube so as to close the receptacle sufficiently to prevent the ingredients being forced therefrom by the boiling of the water in the pot. Said cover is provided with perforations 24 to provide for the circulation of the water and permit of the water dropping back into the receptacle.

This cover is preferably provided with an upstanding rim 25 and with an inwardly projecting flange 26 to fit in the upper end of the receptacle.

In practice, the tea, coffee or other ingredient is placed in the receptacle before the holder is placed in the pot and the cover 12 slid down the tube until flange 26 thereof fits in the receptacle, thus closing the open upper end of said receptacle to prevent displacement of the ingredients. Next the device is placed in the pot and a quantity of water then poured into the pot and the latter placed over a suitable flame until the water boils. As the water boils it will bubble up thru the tube 14 and overflow from the upper end on to the disc 18 and then trickle back thru the perforations 19 into the body of the brew or on to the cover 12 of the receptacle, and thru the perforations therein so as to enter the receptacle. At the same time some of the water passing thru the tube 14 will be forced thru the perforations 23 into the upper portion of the receptacle 11 and as the water boils out of the base, it will be replaced by other water or the brew flowing thru the perforations 10, and this water and brew circulating into the several different directions will cause the flavor of the ingredients in the receptacle to be extracted until the desired strength is obtained.

Of course I do not wish to be limited to the exact details of construction as herein shown as these may be varied within the limits of the appended claims without departing from the spirit of my invention.

Having thus fully described my invention, what I claim as new and useful is:—

1. As an article of manufacture, a tea and coffee holder for pots comprising a dome-shaped base having perforations thereabout adjacent its lower edge, a perforated receptacle fixed to said base above the perforations in the latter, a tube fixed to the base and communicating with the interior thereof, said tube having perforations only within the confines of receptacle, the upper end of said tube projecting beyond the upper end of the receptacle. A receptacle cover slidably mounted upon the tube, a perforated device fixed to the upper end of said tube and a handle carried by said disc.

2. A tea and coffee holder for pots comprising a concavo convex base provided with perforations adjacent its edge and having an axial hole therein, a perforated receptacle fixed to the base above the perforations in the latter, a tube fixed to the base and having its lower end projecting into the hole in said base so as to form a communication with the interior of said base, said tube projecting beyond the upper end of the receptacle, and having perforations within that portion surrounded by said receptacle, a perforated cover slidably mounted on the tube for coaction with the upper end of the receptacle, a perforated disc fixed to the upper end of the tube and a handle extending above and across said disc to which it is fixed.

3. In a device of the character stated, the combination with a coffee pot or the like, a hollow concavo convex base mounted on the bottom of said pot, said base having perforations, a perforated receptacle fixed to the base, a tube fixed to the base and projecting upwardly in proximity to the top of the pot, a portion of the tube within the receptacle being perforated, a perforated cover for the receptacle provided with an upstanding rim and slidably mounted upon the tube, a perforated disc fixed to the upper end of the tube, and approximately fitting the upper end of the pot and a handle carried by the disc projecting into the space normally occupied by the pot cover.

In testimony whereof, I have hereunto affixed my signature.

SAMSON BORGNIS.